(12) United States Patent  
Miwa et al.

(10) Patent No.: US 6,974,192 B2  
(45) Date of Patent: Dec. 13, 2005

(54) VEHICLE SEAT

(75) Inventors: Kazuya Miwa, Okazaki (JP); Masami Tanaka, Toyota (JP)

(73) Assignee: Mitsubishi Jidosha Kogyo Kabushiki Kaisha, (JP)

( * ) Notice: Subject to any disclaimer, the term of this patent is extended or adjusted under 35 U.S.C. 154(b) by 499 days.

(21) Appl. No.: 10/331,961

(22) Filed: Dec. 30, 2002

(65) Prior Publication Data

US 2003/0160143 A1 Aug. 28, 2003

(30) Foreign Application Priority Data

Dec. 28, 2001 (JP) .............................. 2001-399011

(51) Int. Cl.[7] .............................................. B60N 2/08
(52) U.S. Cl. ..................................... 297/473; 248/430
(58) Field of Search .......................... 297/216.1, 468, 297/473; 248/429, 430; 280/801, 804, 805

(56) References Cited

U.S. PATENT DOCUMENTS

| 4,673,217 | A | * | 6/1987 | Nishiyama et al. ......... 297/473 |
| 4,818,022 | A | * | 4/1989 | Nishimura ................... 297/473 |
| 4,940,285 | A | * | 7/1990 | Suzuki et al. ................ 297/473 |
| 5,087,009 | A | * | 2/1992 | Borlinghaus et al. ....... 248/429 |
| 5,322,348 | A | * | 6/1994 | Johnson ....................... 297/473 |
| 5,785,387 | A | * | 7/1998 | Hernandez et al. ......... 297/473 |
| 6,145,914 | A | * | 11/2000 | Downey et al. ............. 248/430 |
| 6,264,158 | B1 | * | 7/2001 | Downey et al. ............. 248/430 |

FOREIGN PATENT DOCUMENTS

EP 0 962 362 A2 6/1999

* cited by examiner

*Primary Examiner*—Peter R. Brown  
(74) *Attorney, Agent, or Firm*—Rossi, Kimms & McDowell, LLP

(57) ABSTRACT

There is provided a seat belt anchor attaching structure, comprising a seat adjuster for adjusting a seat position by moving an upper rail attached with a seat cushion relatively to a lower rail, and a seating sensor arranged between the seat adjuster and the floor panel and for detecting a presence or absence of a sitting occupant by a downward force applied to the lower rail. An anchor plate of the seat belt for binding the occupant is fixed on the lower rail thereby eliminating the application of an unnecessary load to the seat sensor.

6 Claims, 5 Drawing Sheets

VEHICLE SEAT

CROSS-REFERENCE TO THE RELATED APPLICATION

This non-provisional application incorporates by reference the subject matter of Application No. 2001-899011, field in Japan on Dec. 28, 2001, on which a priority claim is based under 35 U.S.C. §119(a).

BACKGROUND OF THE INVENTION (1) Field of the Invention

The present invention relates to a seat for vehicle, such as for an automobile, and more specifically to a mounting structure for a seat belt anchor.

(2) Description of the Related Art

In the vehicle or the like mounted with an air bag (particularly for the assistant driver's seat), there is provided a seat sensor for detecting an occupant sitting on the seat in order to aim at inflating the air bag only in the event of collision when the occupant is sitting thereon (see Japanese Laid-Open Patent Publication (Kokai) No. 11-108748).

Such a seat sensor is generally arranged between the seat (cushion) and the floor panel). Meanwhile, it is generally a conventional practice to use, as a structure attaching a seat belt anchor to the vehicle, an attaching structure to the floor panel. In the case of arranging a child seat on such a vehicle, generally a seat belt is completely withdrawn out of the retractor and retained by a separate hook or the like to apply a tension to the seat belt at all times.

In such a case, because a tension is always applied to the seat belt, a downward load takes place due to the anchor and buckle of the seat belt. Therefore, there is a fear that a sitting state is incorrectly detected even in the absence of an occupant.

In order to improve this, it is to be considered to attach the anchor of seat belt to the upper rail of seat adjuster such that the seat cushion and seat sensor is free from the application of a downward force by the seat belt at between the anchor and the buckle.

However, where the seat belt anchor is fixed on the upper rail of the seat adjuster, when moving the seat adjuster frontward and inclining the seat back toward the front in order to get in/out the rear seat, the anchor of the seat belt is moved toward the front in unison with the seat adjuster. Consequently, there is a disadvantage that the seat belt obstructs the space for getting in/out and hence hinders against getting in/out.

SUMMARY OF THE INVENTION

The present invention has been made in view of such a problem. It is an object to provide a vehicle seat for preventing incorrect seating detection and making getting in/out easy.

A vehicle seat of the present invention comprises: a seat adjuster for adjusting a position of a seat by moving an upper rail attached with a seat cushion relatively to a lower rail; a load detector arranged between the seat adjuster and a floor and for detecting a downward load applied to the lower rail; and an anchor plate of a seat belt for binding the occupant, the anchor plate being fixed on the lower rail.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A seat belt anchor mounting structure according to the present invention will now be described in detail with reference to the drawings showing a preferred embodiment thereof.

Figure 4:
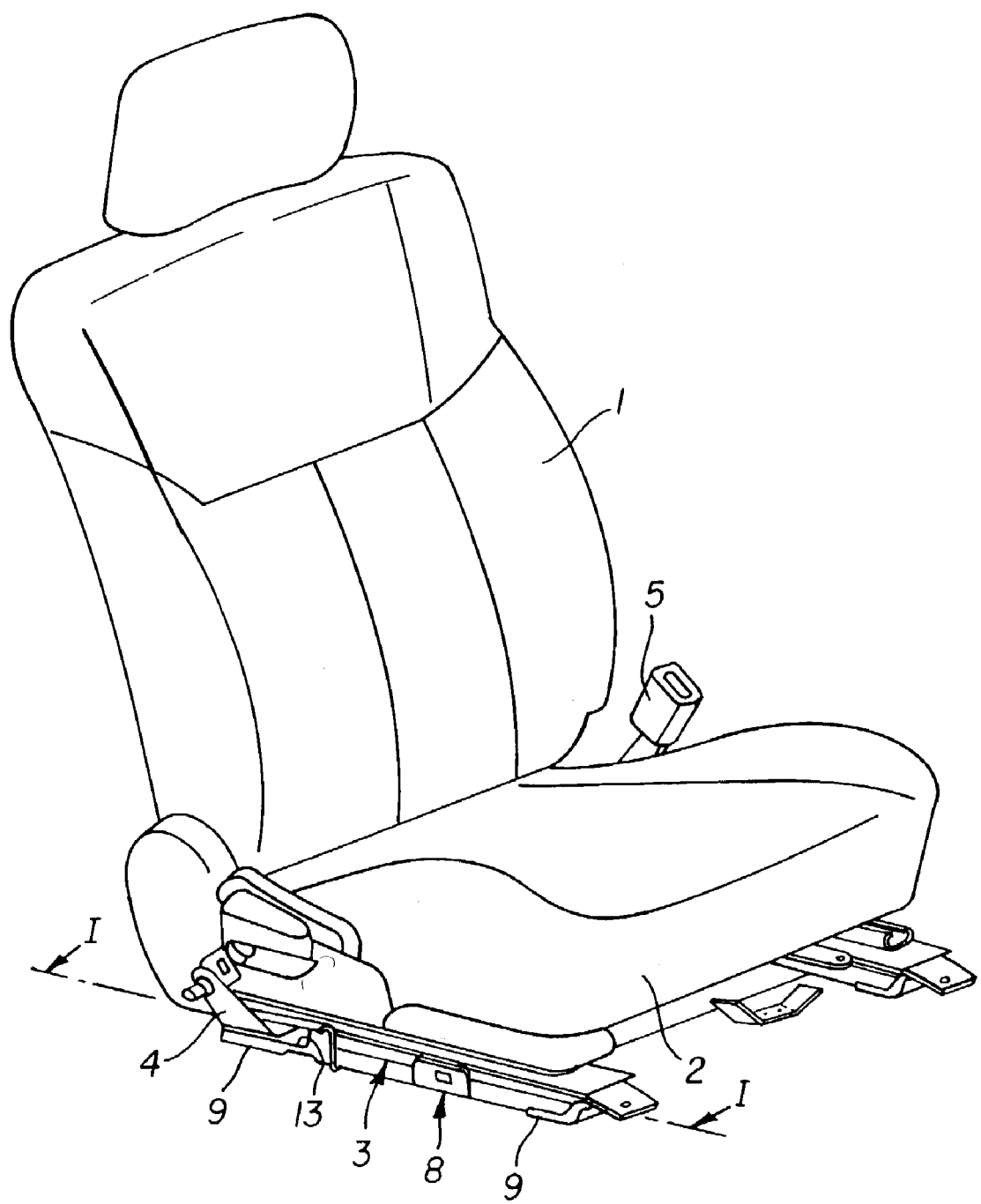
FIG. 4 is an overall perspective view showing a front seat.

In FIG. 4, 1 is a seat back, 2 is a seat cushion, 3 is a seat adjuster for seat position adjustment, 4 is an anchor plate for a seat belt to bind the occupant, and 5 is a buckle for the seat belt. Note that the illustrated example shows an example of an assistant driver's seat of a left-steering-wheel vehicle.

Figure 1:
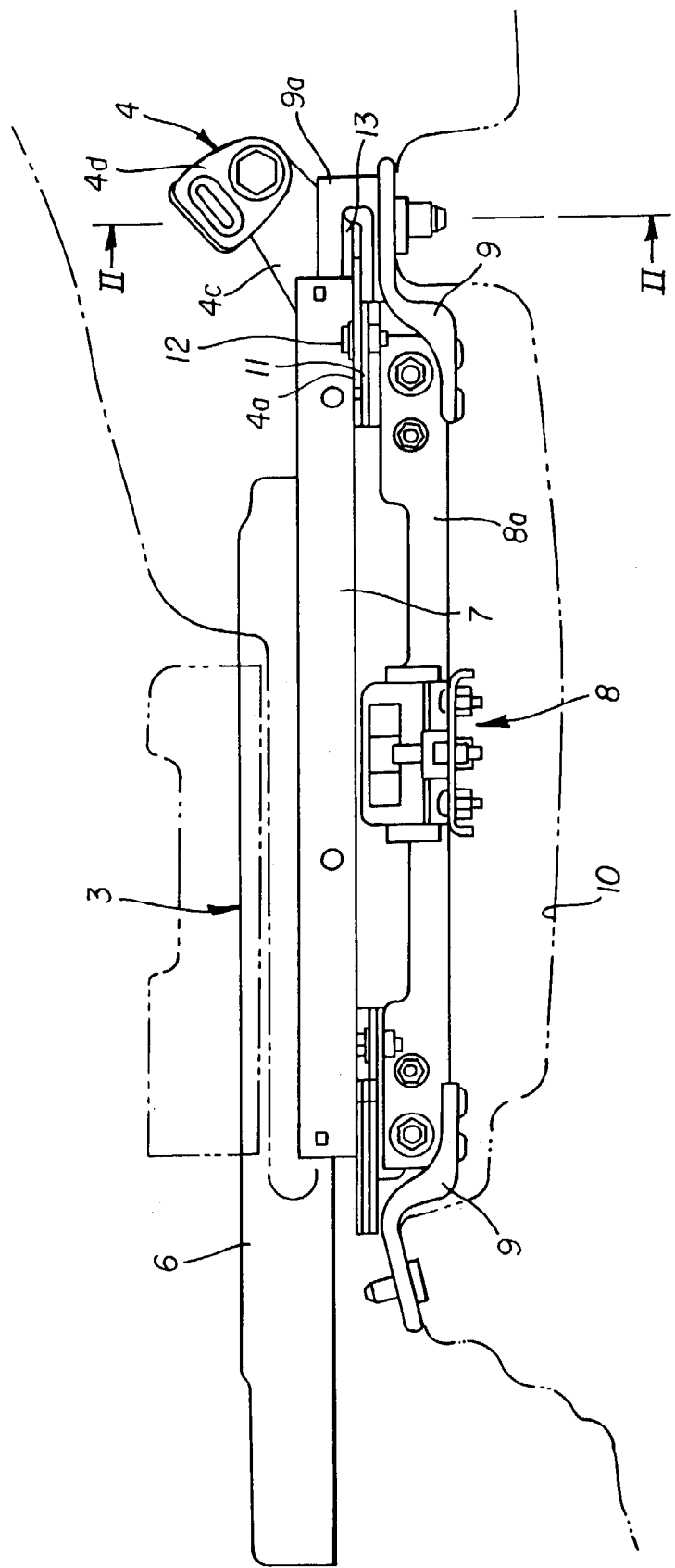
FIG. 1 is an enlarged sectional view of a seat adjuster part showing an embodiment of the present invention.
Figure 2:
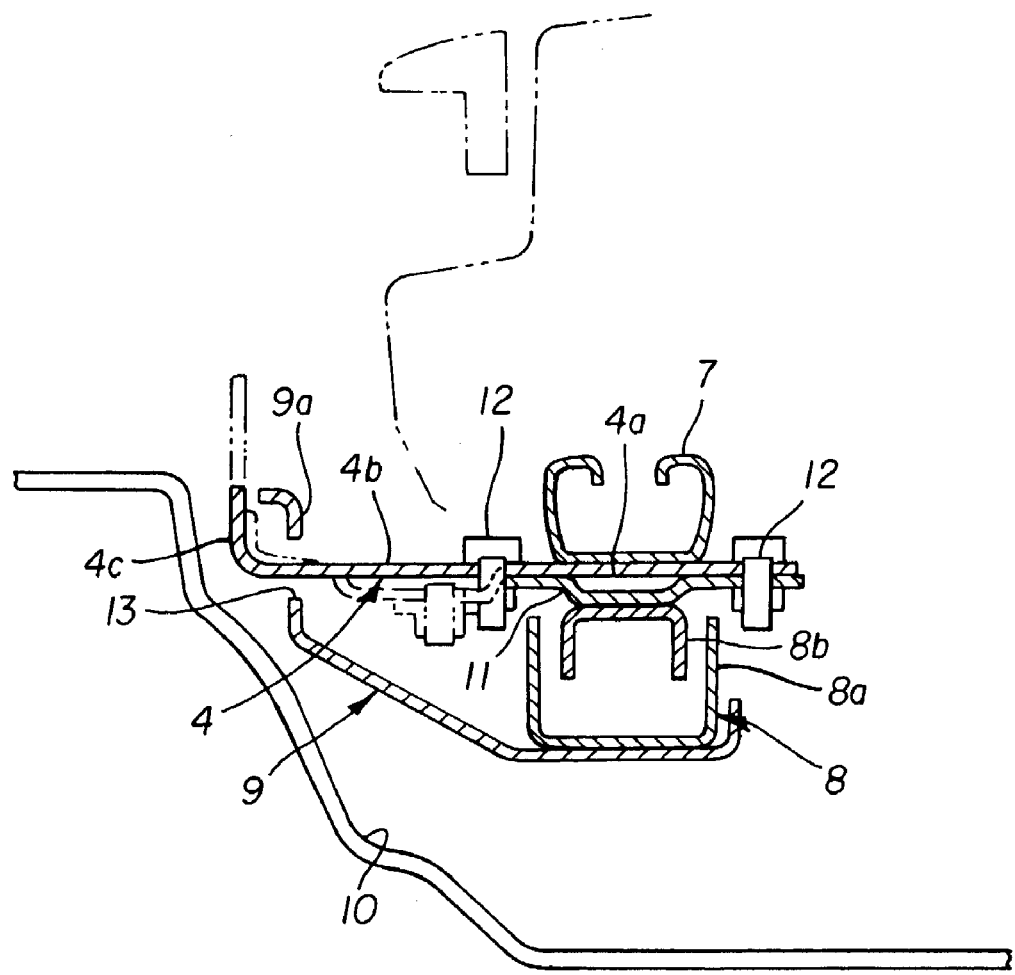
FIG. 2 is a sectional view taken along line II—II in FIG. 1.
Figure 3:
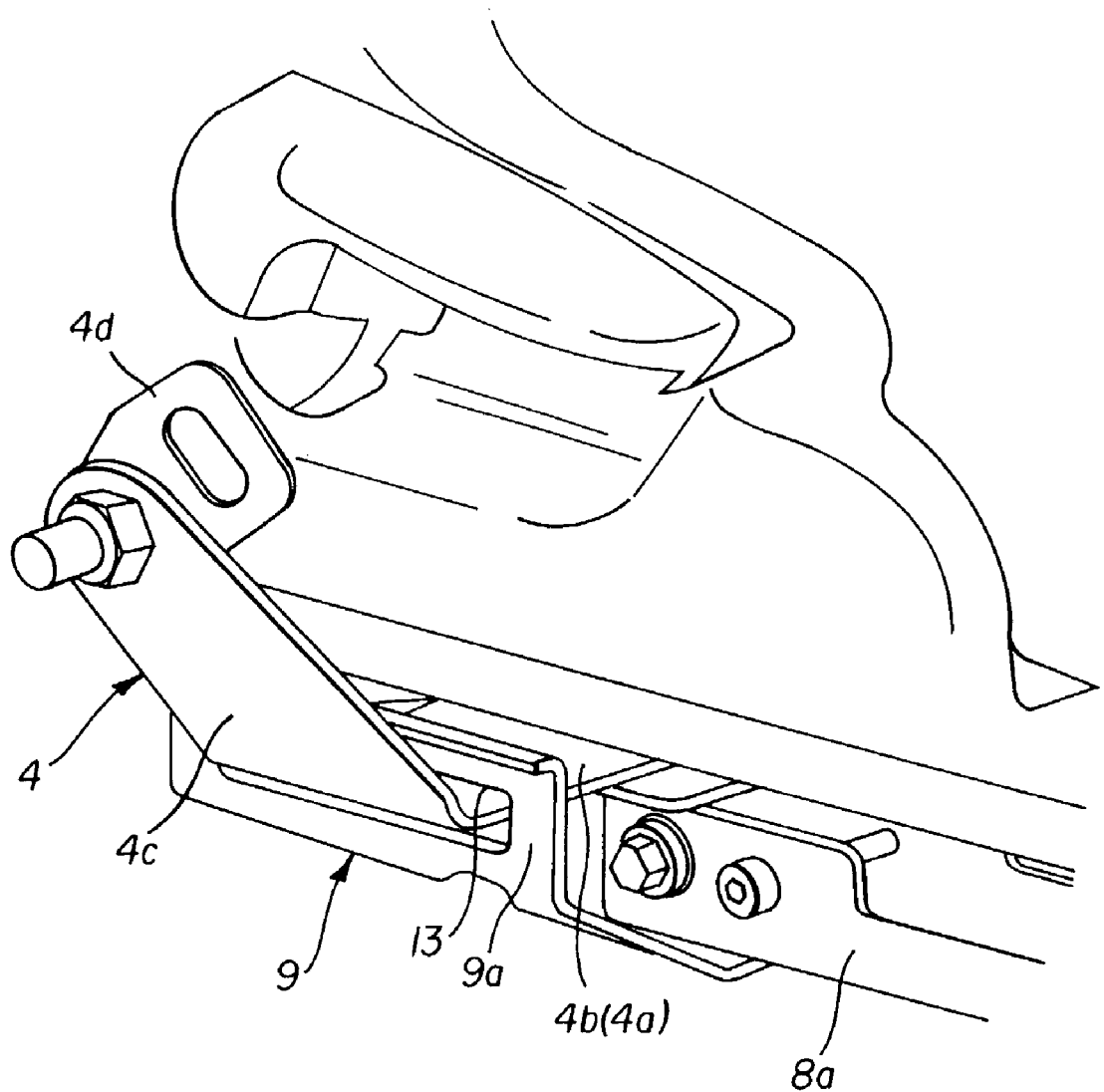
FIG. 3 is an enlarged perspective view showing an anchor plate part.

As also shown in FIGS. 2 to 3, the seat adjuster 3 has an upper rail 6 and a lower rail 7 of a lip-grooved channel type to slidably guide the upper rail back and forth. A seat sensor (load detecting device) 8 is built in a lower surface of the lower rail 7, to detect a presence or absence of occupant seating or a kind of occupant (adult, child, child seat or the like) by a downward load applied to the lower rail 7. The seat sensor 8, at both front and rear ends of a lower sensor housing 8a thereof, is mounted on a floor panel 10 of the vehicle body through a foot bracket 9.

The anchor plate 4 is fixed at a rear end of the lower rail 7. Specifically, as shown in FIG. 2, the fixing plate part 4a of the anchor plate 4 is joined on a lower surface part of the lower rail 7 by welding or the like, in a manner superposed between the lower surface part of the lower rail 7 and the upper surface part of the seat sensor 8, exactly an upper surface part of an upper sensor housing 8b, on the other hand, this is tightened on the mount bracket 11 by bolts 12.

The anchor plate 4 is formed sectionally in an L-form having a lateral extension part 4b laterally projecting in a direction of vehicle width from the fixing plate part 4a and a vertical extension part 4c having a tip bent upward. The anchor plate 4, at its lateral extension part 4b, is inserted in a slit 13, with a space from the slit 13, formed in an upward extension part 9a of the foot bracket 9.

Meanwhile, in the illustrated example, the anchor plate 4 has a separately formed anchor part 4d tightened on the vertical extension part 4c by a bolt 14.

Furthermore, because the lower rail 7 does not move together with the seat, the anchor plate 4 of the seat belt does not move together with the seat adjuster 3 (exactly an upper rail 6 side) toward the front. This eliminates the possibility for the seat belt to obstruct the space of getting on and off (to or from the rear seat of a two-door vehicle), permitting easy getting on and off.

Meanwhile, because the anchor plate 4 is attached on the lower rail 7, the force applied to the seat belt upon vehicle collision can be received on a side of the lower rail 7 fixed integral with the floor panel 10, thus eliminating the necessity of reinforcing the lower rail 7. In this connection, in an attaching structure on a side of the upper rail 6, because the upper rail 6 is loosely engaged (for slide) with the lower rail 7, a moment takes place on the anchor plate 4 about the tip (front end) of the upper rail 6, thus causing a force in a direction of disengaging the upper rail 6 from the lower rail 7.

Meanwhile, the anchor plate 4 at its lateral extension part 4b is inserted in the slit 13 formed in the upward extension part 9a of the foot bracket 9, with a space from the slit 13. Due to this, although the force input from the seat belt is usually received on the side of lower rail 7, the great force upon vehicle collision can be received by the floor panel 10 through the foot bracket 9 instead of the lower rail 7 due to an engagement of the anchor plate 4 with the slit 13. Thus, there is a merit to eliminate the necessity of reinforcing the lower rail 7.

Also, the fixing part 4a of the anchor plate 4 to the lower rail 7 is superposed between the lower surface part of the lower rail 7 and the mount bracket 11 for the seat sensor 8. Due to this, the seat adjuster 8 and the seat sensor 8 can use the existing ones. There is a merit that the invention is easily achieved by the use of the anchor plate 4 sectionally in an L-form.

It is noted that the invention naturally is not limited to the above embodiment but various modifications, including changing the anchor plate form, are possible within the scope not departing from the gist of the invention.

Figure 5:
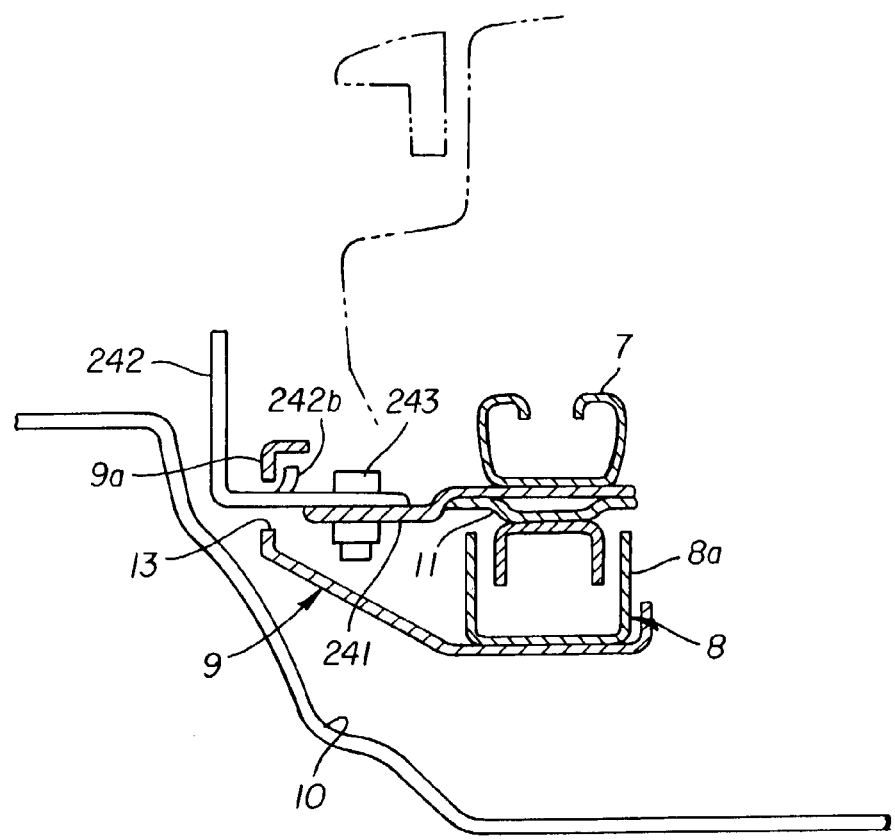
FIG. 5 is a sectional view showing another embodiment.
Figure 6:
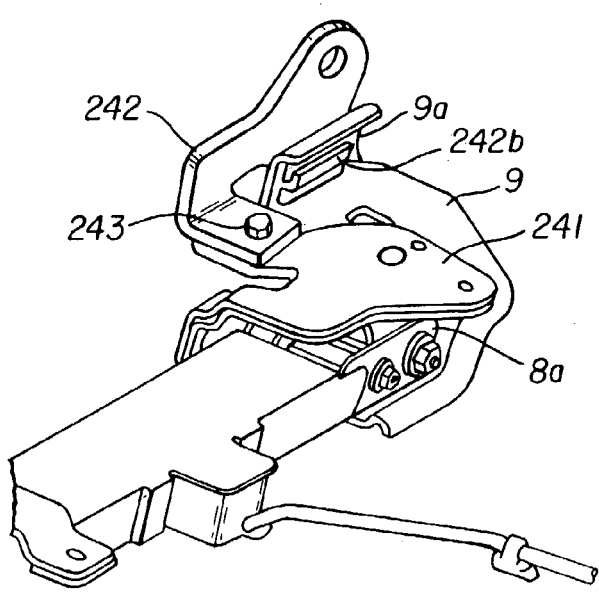
FIG. 6 is an enlarged perspective view showing an anchor plate part corresponding to FIG. 5.

For example, although the foregoing anchor plate 4 was integrally formed sectionally in an L-form, it may be structured by tightening, by a bolt 243 (tightening member), two members, i.e. a first anchor plate member 241 projecting in a direction of vehicle width and a second anchor plate member 242 upwardly bent at a tip of a sectionally L-form member, as shown in FIGS. 5 to 6. In this case, the second anchor plate member 242 is formed with a lateral extension part 242b. This lateral extension part 242b may be inserted in the slit 13 formed in the upward extension part 9a of the foot bracket 9, with a space from the slit 13. Because the tightening part by the tightening member 243 can be provided in a part of the first anchor plate member 241 extending in the vehicle width direction, tightening operation is from the above thereof, facilitating the disassembling and assembling of the same. Although the force input from the seat belt is usually received on the side of lower rail 7, the great force upon vehicle collision can be received by the floor panel 10 through the foot bracket 9 instead of the lower rail 7 due to an engagement of the lateral extension part 242b with the slit 13. Thus, there is a merit to eliminate the necessity of reinforcing the lower rail 7.

What is claimed is:

1. A vehicle seat comprising:
   a seat adjuster for adjusting a position of a seat by moving an upper rail attached with a seat cushion relatively to a lower rail;
   a load detecting device arranged between the seat adjuster and a floor and for detecting a downward load applied to the lower rail; and
   an anchor plate of a seat belt for binding an occupant, the anchor plate being fixed on the lower rail,
   wherein the anchor plate has a lateral extension part projecting in a vehicle-width direction, and the lateral extension part is inserted in a slit formed in a foot bracket fixed on the floor with a space from the slit.

2. A vehicle seat according to claim 1, wherein the load detecting device (8) is fixed on the foot bracket.

3. A vehicle seat according to claim 2, wherein the anchor plate is structured in one body with the lateral extension part and a vertical extension part and formed sectionally in an L-form having a tip bent upward.

4. A vehicle seat according to claim 2, wherein the anchor plate is formed sectionally in an L-form having a first anchor plate extending in a lateral direction and a second anchor plate extending in a vertical direction, the second anchor plate being formed with the lateral extension part.

5. A vehicle seat according to claim 4, wherein the first anchor plate and the second anchor plate extending in the vertical direction are tightened together by tightening member.

6. A vehicle seat according to claim 1, wherein the anchor plate is superposed and fixed between the lower rail and seat detecting device.

* * * * *